No. 785,791.

Patented March 28, 1905.

UNITED STATES PATENT OFFICE.

ANSON GARDNER BETTS, OF TROY, NEW YORK.

PROCESS OF MAKING LEAD DITHIONATE.

SPECIFICATION forming part of Letters Patent No. 785,791, dated March 28, 1905.

Application filed April 11, 1904. Renewed February 20, 1905. Serial No. 246,496.

*To all whom it may concern:*

Be it known that I, ANSON GARDNER BETTS, a citizen of the United States, residing at Troy, in the county of Rensselaer and State of New York, have invented certain new and useful Improvements in Processes of Making Lead Dithionate, of which the following is a specification.

This invention relates to a process of making lead dithionate and at the same time preparing a purified manganese peroxid.

One of the objects of my invention is to produce a soluble lead salt of low cost for uses in the arts.

To carry out my invention, I suspend finely-divided native manganese peroxid in cold water and pass a current of sulfur-dioxid gas through until it ceases to be absorbed, when the manganese and sulfur oxids combine to form manganese dithionate, according to a well-known reaction.

For every part of manganese peroxid employed I use about six parts of water, so that the solution of manganese dithionate resulting from the reaction of sulfur dioxid on the manganese peroxid contains not over twenty-nine per cent. of the salt and usually somewhat less, as a small part of the manganese peroxid is converted into manganese sulfate by the following reaction:

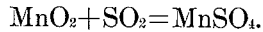

The resulting manganese-dithionate solution is apt to contain manganese sulfate, which I decompose by the addition of the required amount of lead dithionate, when the following reaction takes place:

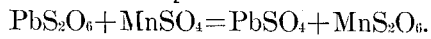

In the purified solution of manganese dithionate I suspend by agitation lead peroxid, when manganese peroxid is precipitated and lead dithionate is formed in the solution, the equation representing the reaction being

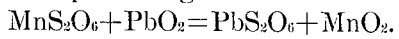

The manganese peroxid may be used over again; but as it is purer than the original ore I prefer to use it for making manganese products, such as potassium permanganate.

What I claim as new, and desire to secure by Letters Patent, is—

1. The process of making lead dithionate which consists in decomposing a solution of manganese dithionate with lead peroxid.

2. The process of making lead dithionate which consists in reacting on manganese peroxid with sulfur dioxid decomposing sulfates in the solution with lead dithionate, and precipitating the manganese with lead peroxid.

3. The process of making lead dithionate which consists in treating native manganese dioxid with sulfur dioxid, and precipitating purified manganese peroxid from the solution with lead peroxid.

In testimony whereof I have signed my name to this specification in the presence of two subscribing witnesses.

ANSON GARDNER BETTS.

Witnesses:
 EDWARD F. KERN,
 WILLIAM VALENTINE.